(12) United States Patent
Uppenkamp et al.

(10) Patent No.: US 12,092,507 B2
(45) Date of Patent: Sep. 17, 2024

(54) METHOD FOR MONITORING CONDITION OF VIBRONIC SENSOR FOR DETERMINING AND MONITORING PROCESS VARIABLE OF MEDIUM IN CONTAINER, INVOLVES DETERMINING STATUS INDICATOR FROM COMPARISON MEASURED VALUE FOR AMPLITUDE AND FREQUENCY WITH REFERENCE VALUE

(71) Applicant: Endress+Hauser SE+Co. KG, Maulburg (DE)

(72) Inventors: Kaj Uppenkamp, Wehr (DE); Christian Strittmatter, Rickenbach (DE); Armin Wernet, Rheinfelden (DE); Sascha D'Angelico, Rümmingen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 308 days.

(21) Appl. No.: 17/610,033

(22) PCT Filed: Apr. 8, 2020

(86) PCT No.: PCT/EP2020/060038
§ 371 (c)(1),
(2) Date: Nov. 9, 2021

(87) PCT Pub. No.: WO2020/229064
PCT Pub. Date: Nov. 19, 2020

(65) Prior Publication Data
US 2022/0221324 A1    Jul. 14, 2022

(30) Foreign Application Priority Data

May 16, 2019    (DE) .................... 10 2019 112 866.8

(51) Int. Cl.
*G01F 25/20*    (2022.01)
*G01F 23/296*    (2022.01)

(52) U.S. Cl.
CPC .......... *G01F 25/20* (2022.01); *G01F 23/2967* (2013.01)

(58) Field of Classification Search
None
See application file for complete search history.

(56) References Cited

U.S. PATENT DOCUMENTS 7,146,845 B2 * 12/2006 Raffalt .................... G01F 25/24
                                                    73/1.73
7,681,449 B2    3/2010 Wolf et al.
(Continued)

FOREIGN PATENT DOCUMENTS

CN        1682097 A    10/2005
CN      107407586 A    11/2017
(Continued)

*Primary Examiner* — Peter J Macchiarolo
*Assistant Examiner* — Jermaine L Jenkins
(74) *Attorney, Agent, or Firm* — Mark A. Logan; Endress+Hauser (USA) Holding, Inc.

(57) ABSTRACT

A method for monitoring condition of a vibronic sensor for determining and/or monitoring at least one process variable of a medium in a containment and having at least one sensor unit having a mechanically oscillatable unit includes: exciting the mechanically oscillatable unit by means of an excitation signal such that mechanical oscillations are executed, and receiving the mechanical oscillations in the form of a received signal, determining a measured value for amplitude and a measured value for frequency of the received signal, comparing the measured values for amplitude and frequency with reference values for amplitude and frequency, and ascertaining a condition indicator from the comparison.

11 Claims, 1 Drawing Sheet

(56) References Cited

U.S. PATENT DOCUMENTS

| | | |
|---|---|---|
| 2010/0005879 A1 | 1/2010 | Getman |
| 2011/0226054 A1* | 9/2011 | Sears ................... G01F 25/20 73/290 V |
| 2020/0116545 A1* | 4/2020 | Vogt ..................... G01N 9/002 |
| 2022/0196456 A1* | 6/2022 | Girardey ............... G01F 23/296 |

FOREIGN PATENT DOCUMENTS

| | | |
|---|---|---|
| CN | 108369128 A | 8/2018 |
| DE | 10014724 A1 | 9/2001 |
| DE | 10328296 A1 | 1/2005 |
| DE | 102004036359 A1 | 11/2005 |
| DE | 102011088351 A1 | 6/2013 |
| DE | 102012103165 A1 | 10/2013 |
| DE | 102017102550 A1 | 8/2018 |
| WO | 2011038985 A1 | 4/2011 |
| WO | 2016139051 A1 | 9/2016 |

* cited by examiner

METHOD FOR MONITORING CONDITION OF VIBRONIC SENSOR FOR DETERMINING AND MONITORING PROCESS VARIABLE OF MEDIUM IN CONTAINER, INVOLVES DETERMINING STATUS INDICATOR FROM COMPARISON MEASURED VALUE FOR AMPLITUDE AND FREQUENCY WITH REFERENCE VALUE

CROSS-REFERENCE TO RELATED APPLICATIONS

The present application is related to and claims the priority benefit of German Patent Application No. 10 2019 112 866.8, filed on May 16, 2019 and International Patent Application No. PCT/EP2020/060038, filed on Apr. 8, 2020, the entire contents of which are incorporated herein by reference.

TECHNICAL FIELD

The invention relates to a method for monitoring condition of a vibronic sensor for determining and/or monitoring at least one, especially physical or chemical, process variable of a medium in a containment. The vibronic sensor includes a sensor unit having a mechanically oscillatable unit. The process variable to be monitored can be, for example, the fill level or flow of a medium, however, also the density, or the viscosity, of a medium. The containment is, for example, a container or a pipeline.

BACKGROUND

Vibronic sensors are widely used in process and/or automation technology. In the case of fill level measuring devices, such have at least one mechanically oscillatable unit, such as, for example, an oscillatory fork, a single tine or a membrane. Such is excited during operation by means of a driving/receiving unit, frequently in the form of an electromechanical transducer unit, such that mechanical oscillations are executed. The electromechanical transducer unit can be, in turn, for example, a piezoelectric drive or an electromagnetic drive.

Corresponding field devices are manufactured by the applicant in great variety and in the case of fill level measuring devices sold, for example, under the marks, LIQUIPHANT and SOLIPHANT. The underpinning measuring principles are known, in principle, from a large number of publications. The driving/receiving unit excites the mechanically oscillatable unit by means of an electrical excitation signal, such that mechanical oscillations are executed. Conversely, the driving/receiving unit can receive the mechanical oscillations of the mechanically oscillatable unit and convert them into an electrical, received signal. The driving/receiving unit can be either a separate driving unit and a separate receiving unit or a combined driving/receiving unit.

In such case, the driving/receiving unit is in many cases part of a feed back, electrical, oscillatory circuit, by means of which the exciting of the mechanically oscillatable unit occurs, such that mechanical oscillations are executed. For example, for a resonant oscillation, the oscillatory circuit condition must be fulfilled, according to which the amplification factor is and all phases arising in the oscillatory circuit must sum to a multiple of 360°.

For exciting and fulfilling the oscillatory circuit condition, a certain phase shift between the excitation signal and the received signal must be assured. Therefore, frequently, a predeterminable value for the phase shift, thus, a desired value for the phase shift between the excitation signal and the received signal, is set. Known for this in the state of the art are the most varied of solutions, including both analog as well as also digital methods. In principle, the setting of the phase shift can be performed, for example, by use of a suitable filter, or be controlled by means of a control loop to a predeterminable phase shift, the desired value. Known from DE102006034105A1, for example, is to use an adjustable phase shifter. The additional integration of an amplifier with adjustable amplification factor for additional control of the oscillation amplitude is described, in contrast, in DE102007013557A1. DE102005015547A1 proposes the application of an allpass filter. The establishing the phase shift is, moreover, possible by means of a so-called frequency sweep, such as disclosed, for example, in DE102009026685A1, DE102009028022A1, and DE102010030982A1. The phase shift can, however, also be controlled by means of a phase control loop (phase locked loop, PLL) to a predeterminable value. Such an excitation method is the subject matter of DE102010030982A1.

Both the excitation signal as well as also the received signal are characterized by frequency $\omega$, amplitude A and/or phase $\phi$. Correspondingly, changes in these variables are usually taken into consideration for determining the particular process variable, such as, for example, a predetermined fill level of a medium in a container or the density and/or viscosity of a medium or the flow of a medium through a tube or pipe. In the case of a vibronic limit level switch for liquids, for example, it is distinguished, whether the oscillatable unit is covered by the liquid or freely oscillating. These two states, the free state and the covered state, are distinguished, in such case, for example, based on different resonance frequencies, thus, a frequency shift. The density and/or viscosity, in turn, can be ascertained with such a measuring device only when the oscillatable unit is covered by the medium as, for example, described in DE10050299A1, DE102007043811A1, DE10057974A1, DE102006033819A1, and DE102015102834A1

In order to assure the reliable working of a vibronic sensor, the state of the art provides different methods, by means of which information concerning condition of the vibronic sensor can be gained. Known from DE102005036409A1, for example, is a method for monitoring the quality of a vibronic sensor. A measuring device includes at least one power measuring unit, which monitors the energy requirement of the exciter/receiving unit at least for the case of resonant oscillations. In this way, information with reference to the quality of the vibronic sensor can be gained. The higher the quality, the less energy is required for exciting resonant oscillations. If thus, the energy requirement for exciting resonant oscillations rises during a predeterminable period of time, or exceeds the quality ascertained during the production of the sensor by a predeterminable limit value, then it can be concluded that a defect, an accretion in the region of the oscillatable unit or the like is present.

Known from DE102007008669A1, in turn, is a vibronic sensor with an electronics unit, which comprises a phase measuring unit, an adjustable phase shifter and a phase adapting unit, which controls the setting of the phase shift between excitation signal and received signal. Control parameters can be updated and stored in predeterminable time intervals over the duration of operation of the sensor. Furthermore, a monitoring of the condition can be performed based on a comparison between stored control parameters and current control data.

DE102017111392A1 describes a method for monitoring condition of a vibronic sensor, in the case of which, based on a spectrum of the received signal or a variable derived therefrom, information with reference to condition of the sensor is ascertained as a function of excitation frequency.

Known from DE102017102550A1 is a method for monitoring condition of a vibronic sensor based on comparing with a reference value a measured value of a physical and/or chemical variable of the sensor characteristic for the sensor, for example, the frequency. In this way, for example, information with reference to corrosion, abrasion or accretion in the region of the oscillatable unit can be gained.

Often with the known methods it is, however, only possible to say that, in principle, corrosion, abrasion or accretion is present. The exact locating, and exact determining, of the cause of a changed oscillatory behavior of the particular sensor are, in contrast, often not ascertainable alone from the measurement signals.

SUMMARY

Therefore, an object of the invention is to provide a method for monitoring condition of a vibronic sensor, which method enables an as exact as possible monitoring of the condition.

The object is achieved according to the invention by a method for monitoring condition of a vibronic sensor for determining and/or monitoring at least one process variable of a medium in a containment and having at least one sensor unit having a mechanically oscillatable unit, comprising method steps as follows:

- exciting the mechanically oscillatable unit by means of an excitation signal, such that mechanical oscillations are executed, and receiving the mechanical oscillations in the form of a received signal,
- determining a measured value for amplitude and a measured value for frequency of the received signal,
- comparing the measured values for amplitude and frequency with reference values for amplitude and frequency, and
- ascertaining a condition indicator from the comparison.

Since the frequency and the amplitude are considered at the same time, an especially exact monitoring of the condition can be implemented. Advantageously, while monitoring condition, the process in which the sensor is located does not need to be interrupted. By recording the measured values for frequency and amplitude, development of the sensor can be observed as a function of time.

The method of the invention advantageously enables, furthermore, the performing of predictive maintenance. Based on determined measured values for amplitude and frequency, it can, for example, be estimated, when maintenance of the sensor will be required.

In an embodiment of the method, a deviation between measured values and reference values for frequency and/or amplitude is determined, and the condition indicator ascertained based on the deviation. For such purpose, it is advantageous to ascertain, whether deviation between measured value and reference value for frequency and/or amplitude exceeds a predeterminable limit value.

In an additional embodiment of the method, reference values for amplitude and frequency are, in each case, a value, especially a measured value, for amplitude and frequency, which value corresponds to a resonant oscillation of the oscillatable unit in the fundamental oscillation mode and in air. For example, the references values can be ascertained during production of the sensor and stored, for example, in a memory unit, in a database or on a data sheet. The reference values correspond then to the delivery condition of the sensor. The reference values can, however, also be ascertained at the customer's plant and after installation in a containment. Since reference values are individually determined for each sensor, the usual variations of the values resulting from production tolerances can be handled directly.

An embodiment of the method includes that the mechanically oscillatable unit is excited in air to mechanical resonant oscillations in the fundamental oscillation mode, and wherein the received signal represents resonant oscillations of the oscillatable unit in the fundamental oscillation mode. The monitoring condition is, thus, performed in this case, when the oscillatable unit is not covered by medium.

In a preferred embodiment of the method, the condition indicator is information with reference to an accretion, corrosion, or abrasion in the region of the oscillatable unit, a defect in the region of a driving/receiving unit, by means of which the exciting of the oscillatable unit occurs, such that mechanical oscillations are executed, or a defect of an electronics of a sensor comprising the oscillatable unit.

Advantageously, the oscillatable unit is an oscillatory fork comprising a membrane and two oscillatory tines secured to the membrane.

The monitoring of the condition according to the invention provides a plurality of different pieces of information concerning the oscillatable unit, of which some especially preferred variants of the monitoring of the condition are as follows:

An embodiment of the method provides that in the case that no measured value is ascertainable for amplitude, and measured value for frequency is less than reference value, such indicates presence of corrosion and/or abrasion on the oscillatory tines and/or hard accretion in the region of the membrane.

An embodiment of the method provides that in the case that deviation between measured value and reference value for amplitude is less than a predeterminable reference value, and measured value for frequency is less than the limit value, such indicates a hard accretion in the region of the oscillatory tines and/or corrosion and/or abrasion in the region of the membrane.

Another embodiment of the method includes that when measured value for amplitude and measured value for frequency are less than their reference values, such indicates a soft accretion in the region of the oscillatory tines and/or media residues in the region of the oscillatable unit.

Another embodiment includes that when measured value for amplitude is less than reference value, and deviation between measured value and reference value for frequency is less than a predeterminable limit value, such indicates a defect in the region of the driving/receiving unit, especially in the region of at least one piezoelectric element of the driving/receiving unit, and/or a defect in the region of an electronics unit.

In the case, in which the oscillatable unit executes oscillations with a predeterminable shedding frequency, such can indicate, for example, the presence of a defect of the driving/receiving unit, a poor contacting, a cable break, a blockage of the oscillatory tines or a defect in an electronics unit.

In the case, in which no measured value for frequency is ascertainable, such can indicate a defect of the electronics unit.

Another preferred embodiment, includes that the method is embodied according to the IO-Link standard. The IO-Link standard is defined in the standard, IEC61131-9 and is a technique widely distributed in automation technology for connecting intelligent actuators and sensors. IO-Link relates to a serial point-to-point connection, via which data are transmitted between a so-called IO-Link master and one or more connected IO-Link devices as slaves. The master is, for example, a fieldbus module or a PLC interface module, which has one or more ports for connecting IO-Link devices. The IO-Link-master represents the connection between the IO-Link device and the automation system and communicates, for example, via a fieldbus. The IO-Link devices are, in contrast, the sensors, actuators, interaction elements or display units. The IO-Link devices are described, in such case, via so-called IODD-description files (IO-Link Device Description), which contain, for example, device-specific configuration parameters of the IO-Link devices.

In summary, the invention enables a precise monitoring of the condition of a vibronic sensor. The monitoring is very simply implementable and can be performed while the process continues. Because of the consideration of frequency and amplitude at the same time, an exact monitoring of the condition is possible, based on which not only the presence of a defect can be indicated but also the locating of the defect within the sensor and also the determining of the cause of a particular changed behavior.

The invention as well as its advantages will now be more exactly described based on the appended drawing, the figures of which show as follows:

DETAILED DESCRIPTION

Figure 1:
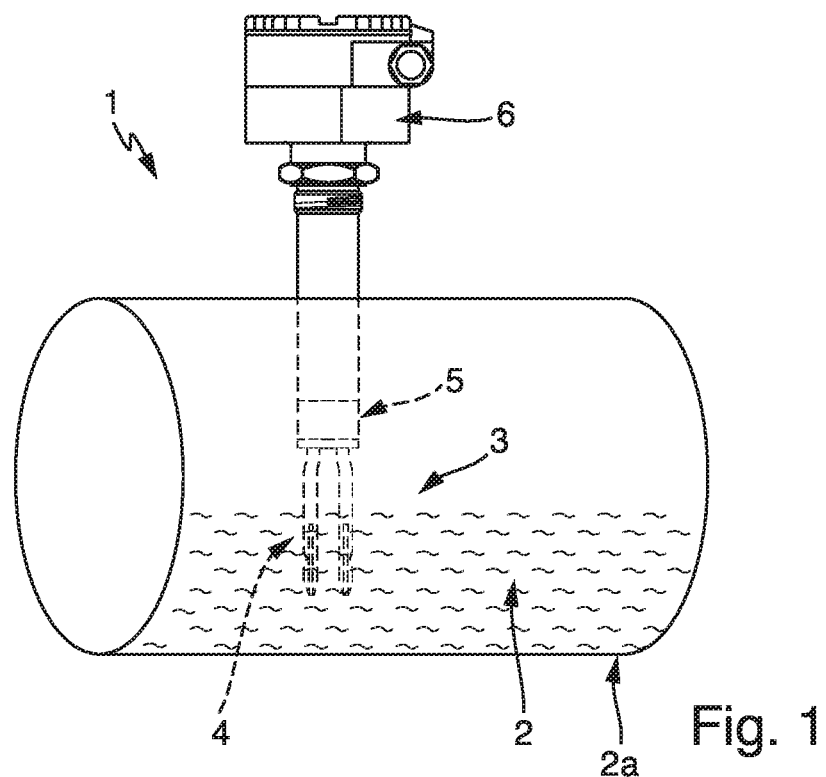
FIG. 1 shows a vibronic sensor according to the state of the art.

FIG. 1 shows a vibronic sensor 1, including a sensor unit 3 with an oscillatable unit 4 in the form of an oscillatory fork, which is partially immersed in a medium 2 located in a container 2a. The oscillatable unit 4 is excited by means of the exciter/receiving unit 5, such that mechanical oscillations are executed. The exciter/receiving unit 5 can be, for example, a piezoelectric stack- or bimorph drive. It is understood, however, that also other embodiments of a vibronic sensor fall within the scope of the invention. Also included is an electronics unit 6, by means of which signal registration,—evaluation and/or—feeding occurs.

Figure 2:
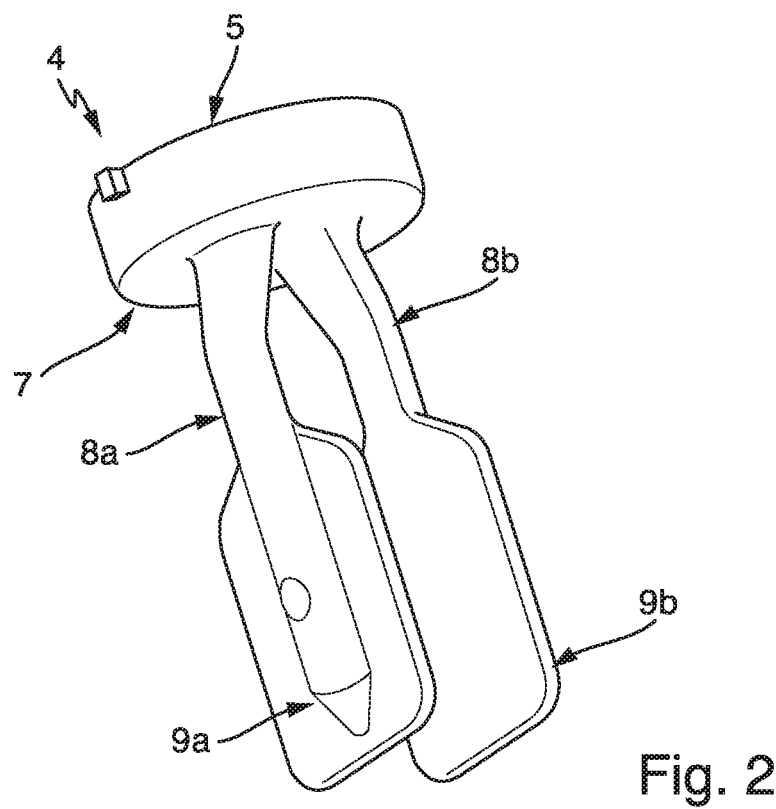
FIG. 2 shows an oscillatable unit of a vibronic sensor in the form of an oscillatory fork.

FIG. 2 shows in a side view an oscillatable unit 4 in the form of an oscillatory fork, such as used, for example, in the vibronic sensor 1 sold by the applicant under the mark LIQUIPHANT. Oscillatory fork 4 includes, formed on a membrane 7, two oscillatory tines 8a,8b, on which are terminally formed two paddles 9a,9b. The oscillatory tines 8a,8b together with the paddles 9a,9b are frequently also referred to as fork tines. In order to cause the mechanically oscillatable unit 4 to execute mechanical oscillations, a force is exerted on the membrane 7 by means of a driving/receiving unit 5 secured by material bonding to the side of the membrane 7 opposite that carrying the oscillatory tines 8a,8b. The driving/receiving unit 5 is an electromechanical transducer unit, and comprises, for example, a piezoelectric element, or an electromagnetic drive (not shown). Either the driving/receiving unit 5 is comprised of separate driving and receiving units, or it is a combined driving/receiving unit. In the case, in which the driving/receiving unit 5 comprises a piezoelectric element 9, the force exerted on the membrane 7 is generated by applying an excitation signal $U_E$, for example, in the form of an alternating electrical voltage. A change of the applied electrical voltage effects a change of the geometric shape of the driving/receiving unit 5, thus, a contraction or an expansion within the piezoelectric element, in such a manner that the applying of an alternating electrical voltage as excitation signal $U_E$ brings about an oscillation of the membrane 7 connected by material bonding with the driving/receiving unit 5.

Conversely, the mechanical oscillations of the oscillatable unit are transmitted via the membrane to the driving/receiving unit 5 and converted into an electrical, received signal $U_R$. The particular process variable, for example, a predeterminable fill level of medium 2 in the container 2a, or the density or viscosity of the medium 2, can then be ascertained based on the received signal $U_R$.

An option for monitoring condition of the vibronic sensor will now be explained based on comparing a measured frequency f and a measured amplitude A of the oscillatable unit 4 for an exciting at the fundamental oscillation mode of the oscillatable unit 4. In a first step, reference values $f_{ref}$, $A_{ref}$ for amplitude and frequency are ascertained, wherein the oscillatable unit 4 is excited to execute resonant oscillations in air.

For ascertaining information with reference to condition of the sensor 1 during ongoing operation, the oscillatable unit is excited anew by means of a excitation signal $U_E$, such that mechanical oscillations are executed in the fundamental oscillation mode and the received signal $U_R$ representing the oscillations is received and evaluated as regards frequency f and amplitude A. At this point in time, the oscillatable unit 4 is not covered by medium. These values f, A are then compared, for example, with their reference values $f_{ref}$, $A_{ref}$ and deviations of the measured values f, A from reference values $f_{ref}$, $A_{ref}$ are ascertained.

For example, a predeterminable limit value can be defined. If the deviation exceeds this limit value, then, in given cases, a problem is present, or the sensor 1 needs to be serviced. The method of the invention offers, thus, the advantage of predictive maintenance.

The invention claimed is:

1. A method for monitoring condition of a vibronic sensor for determining and/or monitoring at least one process variable of a medium in a containment and having at least one sensor unit having a mechanically oscillatable unit, the method comprising:

exciting the mechanically oscillatable unit by means of an excitation signal such that mechanical oscillations are executed;

receiving the mechanical oscillations in the form of a received signal;

determining a measured value for amplitude and a measured value for frequency of the received signal;

comparing the measured values for amplitude and frequency with respective reference values for amplitude and frequency; and ascertaining a condition indicator from the comparison, wherein when no measured value is ascertainable for amplitude and the measured value for frequency is less than the reference value, such indicates the presence of corrosion and/or abrasion on the oscillatory tines and/or a hard accretion in the region of the membrane.

2. The method as claimed in claim 1, further comprising:
ascertaining a deviation between the measured values and the respective reference values for frequency and/or amplitude,
wherein the condition indicator is ascertained based on the deviation.

3. The method as claimed in claim 2, further comprising:
ascertaining whether the deviation for frequency and/or for amplitude exceeds a predeterminable limit value.

4. The method as claimed in claim 1,
wherein the reference values for amplitude and frequency are values for amplitude and frequency corresponding to a resonant oscillation of the oscillatable unit in a fundamental oscillation mode and in air.

5. The method as claimed in claim 1,
wherein the mechanically oscillatable unit is excited in air to mechanical resonant oscillations in the fundamental oscillation mode, and wherein the received signal represents resonant oscillations of the oscillatable unit in the fundamental oscillation mode.

6. The method as claimed in claim 1,
wherein the condition indicator is information with reference to: an accretion, corrosion, or abrasion in the region of the oscillatable unit; a defect in the region of a driving/receiving unit by means of which the exciting of the oscillatable unit occurs such that mechanical oscillations are executed; or a defect of an electronics of a sensor which comprises the oscillatable unit.

7. The method as claimed in claim 1,
wherein the oscillatable unit is an oscillatory fork comprising a membrane and two oscillatory tines secured to the membrane.

8. The method as claimed in claim 1,
wherein the method is embodied according to the IO-Link standard.

9. A method, for monitoring condition of a vibronic sensor for determining and/or monitoring at least one process variable of a medium in a containment and having at least one sensor unit having a mechanically oscillatable unit; the method comprising:
exciting the mechanically oscillatable unit by means of an excitation signal such that mechanical oscillations are executed;
receiving the mechanical oscillations in the form of a received signal; determining a measured value for amplitude and a measured value for frequency of the received signal;
comparing the measured values for amplitude and frequency with respective reference values for amplitude and frequency;
ascertaining a condition indicator from the comparison; and
ascertaining a deviation between the measured values and the respective reference values for frequency and/or amplitude,
wherein the condition indicator is ascertained based on the deviation, and
wherein when the deviation between the measured value and the reference value for amplitude is less than a predeterminable limit value and the measured value for frequency is less than the reference value, such indicates a hard accretion in the region of the oscillatory tines and/or corrosion and/or abrasion in the region of the membrane.

10. A method, for monitoring condition of a vibronic sensor for determining and/or monitoring at least one process variable of a medium in a containment and having at least one sensor unit having a mechanically oscillatable unit, the method comprising:
exciting the mechanically oscillatable unit by means of an excitation signal such that mechanical oscillations are executed;
receiving the mechanical oscillations in the form of a received signal;
determining a measured value for amplitude and a measured value for frequency of the received signal;
comparing the measured values for amplitude and frequency with respective reference values for amplitude and frequency; and
ascertaining a condition indicator from the comparison,
wherein when the measured value for amplitude and the measured value for frequency are less than their respective reference values, such indicates a soft accretion in the region of the oscillatory tines and/or media residues in the region of the oscillatable unit.

11. A method, for monitoring condition of a vibronic sensor for determining and/or monitoring at least one process variable of a medium in a containment and having at least one sensor unit having a mechanically oscillatable unit, the method comprising:
exciting the mechanically oscillatable unit by means of an excitation signal such that mechanical oscillations are executed;
receiving the mechanical oscillations in the form of a received signal; determining a measured value for amplitude and a measured value for frequency of the received signal;
comparing the measured values for amplitude and frequency with respective reference values for amplitude and frequency;
ascertaining a condition indicator from the comparison; and
ascertaining a deviation between the measured values and the respective reference values for frequency and/or amplitude,
wherein the condition indicator is ascertained based on the deviation, and
wherein when the measured value for amplitude is less than the reference value and the deviation between the measured value and the reference value for frequency is less than a predeterminable limit value, such indicates a defect in the region of the driving/receiving unit in the region of at least one piezoelectric element of the driving/receiving unit and/or a defect in the field of the electronics.

* * * * *